US008678328B2

(12) United States Patent
Smith

(10) Patent No.: US 8,678,328 B2
(45) Date of Patent: Mar. 25, 2014

(54) LANTERN SUPPORT DEVICE FOR SECURING TO A VARIETY OF OBJECTS

(76) Inventor: Vick Smith, San Angelo, TX (US)

( * ) Notice: Subject to any disclaimer, the term of this patent is extended or adjusted under 35 U.S.C. 154(b) by 273 days.

(21) Appl. No.: 13/411,529

(22) Filed: Mar. 3, 2012

(65) Prior Publication Data

US 2013/0228665 A1 Sep. 5, 2013

(51) Int. Cl.
*F16M 11/04* (2006.01)
*F16M 11/24* (2006.01)
*F16M 11/00* (2006.01)

(52) U.S. Cl.
USPC .................. 248/125.3; 248/218.4; 248/316.1; 248/297.21

(58) Field of Classification Search
USPC ................ 248/121, 125.2, 125.3, 154, 218.4, 248/219.4, 316.4, 316.5, 316.6, 316.7, 248/223.41, 225.11, 225.21, 229.13, 286.1, 248/295.11, 297.21; 362/11, 12, 217.01, 362/382, 431; 211/86.01, 107
See application file for complete search history.

(56) References Cited

U.S. PATENT DOCUMENTS

| | | | | |
|---|---|---|---|---|
| 3,501,840 | A * | 3/1970 | Schiler | 33/556 |
| 3,533,583 | A * | 10/1970 | Azim | 248/125.2 |
| 3,906,648 | A * | 9/1975 | Bard | 38/102.2 |
| 3,955,722 | A * | 5/1976 | Bard | 248/125.1 |
| 3,995,796 | A * | 12/1976 | Kline | 248/121 |
| 5,023,755 | A * | 6/1991 | Rosenberg | 362/12 |
| 5,161,768 | A * | 11/1992 | Sarabin | 248/525 |
| 5,615,854 | A * | 4/1997 | Nomura et al. | 248/287.1 |
| 5,944,896 | A * | 8/1999 | Landesman et al. | 248/130 |
| 7,575,676 | B2 * | 8/2009 | Prentice et al. | 210/198.2 |
| 8,245,859 | B2 * | 8/2012 | Sargent | 211/85.7 |
| 2013/0228665 | A1 * | 9/2013 | Smith | 248/316.7 |

* cited by examiner

*Primary Examiner* — Tan Le
(74) *Attorney, Agent, or Firm* — Plager Schack, LLP

(57) ABSTRACT

A lantern support device includes a number of adapter members for attaching of the adapter members and thereby the lantern support device to a variety of objects including poles, posts and rails. Each of the adapters is capable of a slideable engagement with a main body of the support device via bolts, nuts and washers for adjustment of the adapters along the length of the main body. A base clip in the form of a foot of the main body is fixedly attached to the main body and provides for support a portion of the bottom of a user's lantern.

10 Claims, 3 Drawing Sheets

LANTERN SUPPORT DEVICE FOR SECURING TO A VARIETY OF OBJECTS

BACKGROUND OF THE INVENTION

When lantern users need light on a boat, at a campsite, etc., they often have difficulty finding a place to put the lantern where it will be secure, both for lighting purposes and safety purposes. Free swinging hook designs and improvised holders put the lantern at the mercy of outside elements such as wind or possible human or animal clumsiness, and clamp systems are unstable. The random availability of the specific attachment objects needed to use other devices and the lack of versatility of such devices can be inconvenient or unreliable. Also, a consumer may not own or be able to find the specific type of lantern or the specific object required to use a particular device.

Current lantern supporting devices secure permanently or semi-permanently to specific objects and rely on free swinging hook or clamp systems to secure a lantern. Some are designed to only allow the user to secure a specific type of lantern. Lantern users without access to a holder must rely on potentially unstable or non-level surfaces such as a tree limb or the ground.

SUMMARY OF THE INVENTION

The present lantern support removes the possibility of lantern instability and offers much greater attachment versatility via the provision of a number of removable adapters. Poles, rail, post and flat plane adapters allow attachment to a wide range of objects quickly and easily and almost any lantern of the user's choosing may be supported. The concern of the lantern falling down or over or even into water is removed with the provided base clip supporting the base of a lantern while a locking hook secures the handle of a lantern.

DETAILED DESCRIPTION OF THE INVENTION

The lantern support of the present invention generally comprises a main body 12 and a number of adapters. As shown in FIGS. 1-4, main body 12 is preferably configured in an 'L' shape and preferably measures about 23 inches tall, about 2¾ inches wide and includes a base clip 14 about 2 inches in length extending out at a right angle to the very bottom of main body 12 to form the foot of the 'L' shape. Main body 12 has a top channel which begins about ¾ of an inch from the top and runs down the very center for about 6¼ inches. The top channel measures approximately ¼ inch wide on the front of the Main body 12 but ¾ inch wide on the back of the Main body 12 with both channels connecting in the center. Main body 12 also includes a bottom channel which begins approximately 1 inch below the bottom of the top channel and runs about 12½ inches down the center width. The bottom channel is approximately ¼ inch wide through the entire thickness of the main body 12 from front to back. The Main body 12 provides support for all other elements of the invention.

A uniquely-designed trapezoid-shaped base clip 14 measuring 2¾ inches at its widest and tapering to 1¼ inches wide at a length of about 3½ inches long. The center of the trapezoid is cut out with such that surrounding walls are ½ inch thick all around.

Figure 8:
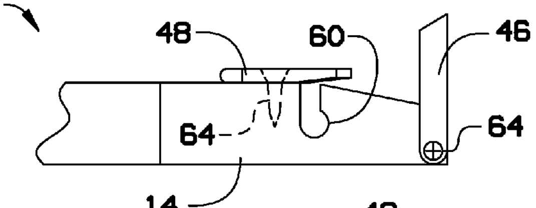
FIG. 8 illustrates a side detail view of base clip 14 with side braces 46 in position for supporting a propane lantern
Figure 9:
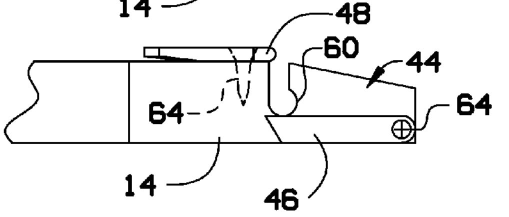
FIG. 9 illustrates a side detail view of base clip 14 with top clips 48 rotated to allow for receipt of a gas lantern
Figure 10:
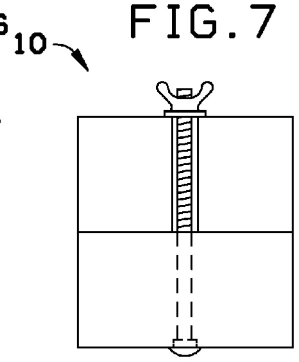
FIG. 10 illustrates an end detail of a bolt, slot, washer and wing-nut in accordance with each of the post, rail and pole adapters of the present invention

Keyhole shaped channels 60 formed in base clip 14 are preferably ½ inch deep and located 2 inches in from the shortest edge and on each side of the trapezoid. The trapezoid is a uniform ¾ inch high on the side near main body 12 and tapers from ¼ inch to ½ inch high to the smaller end distal from main body 12. Two rotating locks 48 attached to the upper surface of base dip 14 just above the keyhole channels 60 and measuring approximately 1 inch long by ½ inch wide. As seen in FIGS. 8 & 9, locks 48 have a rounded short end and a blunted long end that tapers upward approximately 5 degrees. Base clip 14 also includes two rotating support braces 64 that extend out from either outside edge. Braces 64 have a pivot point approximately ¼ inch in from the shortest end of the trapezoid, and measure ⅛ inch thick, ½ inch wide and taper upward from 1½ inches long to 1 inch long. Base clip 14 is preferably connected to the main body 12 using two screws.

In use, base clip 14 securely locks in the base of most currently available gas and propane lanterns. The tapered end of the base clip trapezoid itself is designed to accommodate the curved bottoms of most gas lanterns. The base ridges of most lanterns fit into the keyhole channels 60 on the base dip 14. Support braces 46 are extended upward at a 90 degree angle in order to provide extra support to propane lantern bases. The taper of braces 46 is designed to fit the underside of a propane lantern base. Top clips 48 swivel flat-end forward to lock the base ridge of a propane lantern in the keyhole channels 60. The 5 degree upward taper accommodates the top curve of a propane lantern base. Clips 48 also swivel round-end forward to lock the base ridge of a gas lantern in the keyhole channels 60 and are in the neutral position when pivoted to 90 degree angle to the sides of base lip 14.

One large metal Locking hook 62 with a spring clip mechanism and swivel base measuring approximately 2½ inches long is connected to the front of the top channel of the main body 12 using a ¾ inch cable clamp and two hex nuts. Hex nuts may be slidably received in the increased width portion of top channel at the back of main body to allow adjustment of the hex nuts. Locking hook 62 extends out at a 90 degree angle, being free to swivel vertically between 70 degrees and 110 degrees in relation to the main body 12.

In use, locking hook 62 securely locks a lantern handle so as to hold the lantern upright. It can be adjusted up or down the top channel of main body 12 by slightly loosening the hex nuts on the cable clamp, sliding the hook up or down along the top channel of the main body 12, then retightening them once the Locking hook 62 is in the desired position.

A 'U' shaped flat plane adapter 22 has two arms and measures approximately 8 inches in height, 3½ inches in length, and 1½ inches in width with the two sides being ¾inch thick and the base being 1½ inch thick. The inner area of the "U" is approximately 6½ inches high by 2 inches wide. Both arms of the "U" contain channels 63 measuring approximately 5 inches long by ½ inch wide running through their center lengths. One arm of the "U" also has an indention approximately ¼ inch deep and ½ inch wide running from the outer end of the arm to the start of the arm channel. There are two approximately 9/32 diameter holes drilled through the base of the "U" approximately 1¼ inches apart to receive bolts 38 to secure flat plane adapter 22 to main body 12.

The Flat plane adapter 22 is preferably connected to the bottom channel along the back of the Main Body 12. It can be connected as a sideways 'U' with the bottom being flush with the back of the Main body 12 by means of two 3 inch, ¼ diameter bolts placed through the two holes in the base of the "U" and secured by two wing nuts for easy adjustment and stability. It may also be connected to the Main body 12 as an upside down 'U' by means of two 3 inch, ¼ diameter bolts placed through one of the channels on the legs of the 'U' and then secured by two wing nuts depending on the desired use.

Flat plane adapter 22 is designed to both provide support for other adapters and attach the lantern support to rectangular surfaces such as wooden, horizontal boat dock railings or the side of a Jon boat. When mounted to main body 12 such that one of the arms is mated to an exterior surface of main body 12 (orientation not shown), the flat plane adapter slides down over horizontal plane surfaces measuring 2 inches wide or less. When in the sideways 'U position, as shown, the flat plane adapter's channels can be used to attach and provide further range of motion to other adapters. A small groove on one inner leg of the 'U' is designed to fit over the tie-offs found on most Jon boats, thus adding extra stability.

A rectangular rail adapter 24 preferably measures approximately 7 inches long by 2 inches high by 1½ inches wide. The rail adapter 24 is split exactly down the center lengthwise from side to side and hinged 52 at one end so that it can be opened. Cut out of the rectangle and also split down the center are three shapes; a square centered approximately 2¼ inches from the end opposite the hinge and measuring approximately 1¼ inches by 1¼ minches; a first circle centered approximately 4¼ inches from the end opposite the hinge and measuring approximately ¾ inches in diameter; and a circle second centered approximately 5¾ inches from the end opposite the hinge 52 and measuring approximately 1 inch in diameter. There is an approximate 9/32 diameter hole centered and extending up through one half of the rail adapter 24 approximately ½ inch from the end opposite the hinge to receive rail adapter bolt 40. On the other half of the adapter, there is a bolt channel about ½ inch in length and ½ inch wide centered lengthwise, also on the end opposite the hinge. This bolt channel allows closing of the two halves of rail adapter 24 while a rail adapter bolt 40 is fully inserted into rail adapter 24. In this way, a user need not remove rail adapter bolt 40 to either open rail adapter 24 from its closed position or to close rail adapter 24 from its open position.

Rail adapter 24 may be connected to the underside of the flat plane adapter 22 running parallel to it and at a right angle to the main body 12 when the flat plane adapter 22 is positioned as a sideways 'U' on the lantern support. It is connected by one 3½ inch, ¼ diameter bolt running up through the 9/32 diameter hole in the rail adapter 24 and then into the channel on the bottom leg of the flat plane adapter 22, and then secured by a washer 58, and a wing nut 56. Hence the two halves are kept locked dosed and the Rail adapter 24 is attached to the flat plane adapter 22 allowing rail adapter 24 to rotate 360 degrees. Rail adapter 24 may also be connected to the main body 12 vertically along either the top or bottom channel of flat plane adapter 22 using the same bolt, washer, and wing nut.

In use, rail adapter 24 is designed for attaching the lantern support 10 to standard square and round railings found on boats, RV's, roof racks, etc. Both the hole and the channel on the ends of the adapter opposite the hinge work together to allow the securing bolt to freely swing when the adapter is opened or closed like a clamshell around the appropriate railing. The adapter is then secured with the bolt, washer, and wing nut.

Pole adapter 20, attached to main body 12 near base clip 14 preferably measures 7 inches long, 2¾ inches wide, and 4¼ inches high and is split exactly down the center lengthwise and hinged on one end so that it can be opened a full 180 degrees. A hole approximately 3 inches in diameter centered about 3 inches from the hinged end of pole adapter 20 is formed in the pole adapter and split down the center so that each half hole is on either side of the pole adapter. There is an approximate 9/32 diameter hole which extends up through the center of one half of the pole adapter approximately 1½ inches from the end opposite the hinge to receive pole adapter bolt 42. On the other half of pole adapter 20, there is a bolt channel about 1½ inches in length and ½ inches wide centered lengthwise, also on the end opposite the hinge. Like the bolt channel mentioned above, this bolt channel of the pole adapter 20 allows closing of the two halves of pole adapter 20 while a pole adapter bolt 42 is fully inserted into pole adapter 20. In this way, a user need not remove pole adapter bolt 42 to either open pole adapter 20 from its closed position or to close pole adapter 20 from its open position. Pole adapter 20 may be mounted along either of the top and bottom channels of the main body 12 via one 6 inch, ¼ diameter bolt 42, a washer 58, and a wing nut 56 such that it swivels a full 360 degrees and the wing nut 56 can be tightened to lock pole adapter 20 into any desired position.

Pole adapter 20 is designed to attach the lantern support to standard poles measuring approximately 3 inches to 3½ inches in diameter. Both the hole and the channel on the ends of the pole adapter 20 opposite the hinge work together to allow the 6 inch securing bolt to freely swing when the adapter is opened or closed like a clamshell around pole.

Figure 1:
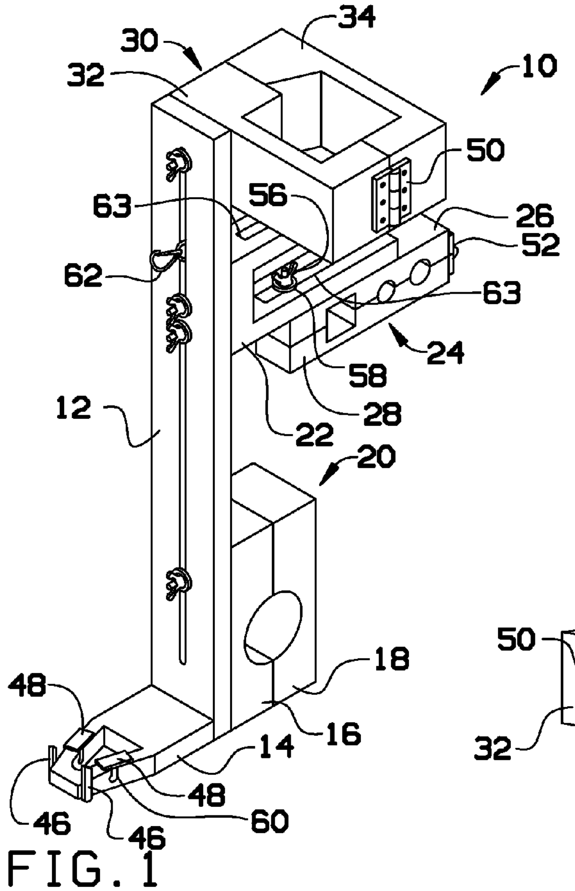
FIG. 1 illustrates a forward perspective view of the lantern support of the present invention.
Figure 2:
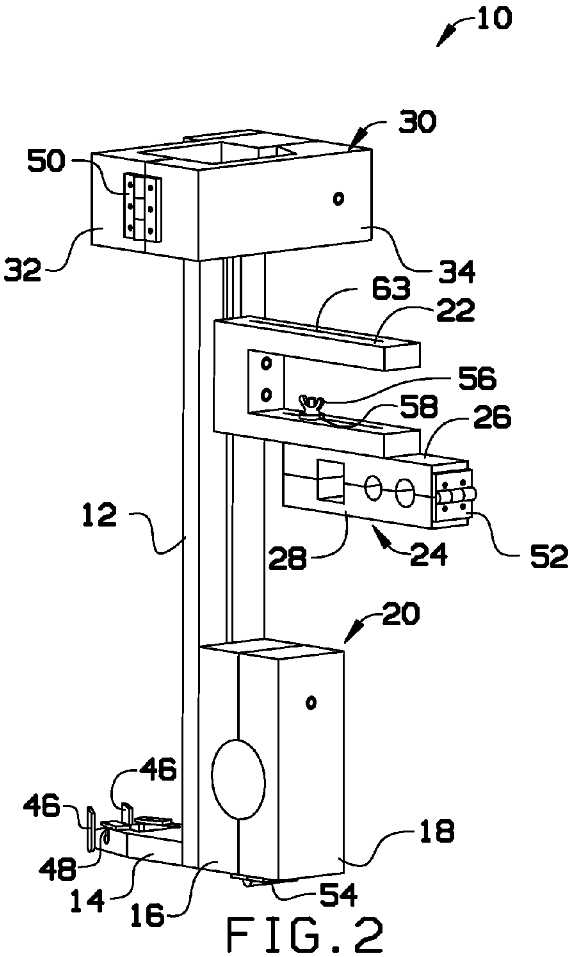
FIG. 2 illustrate are perspective view of the lantern support
Figure 3:
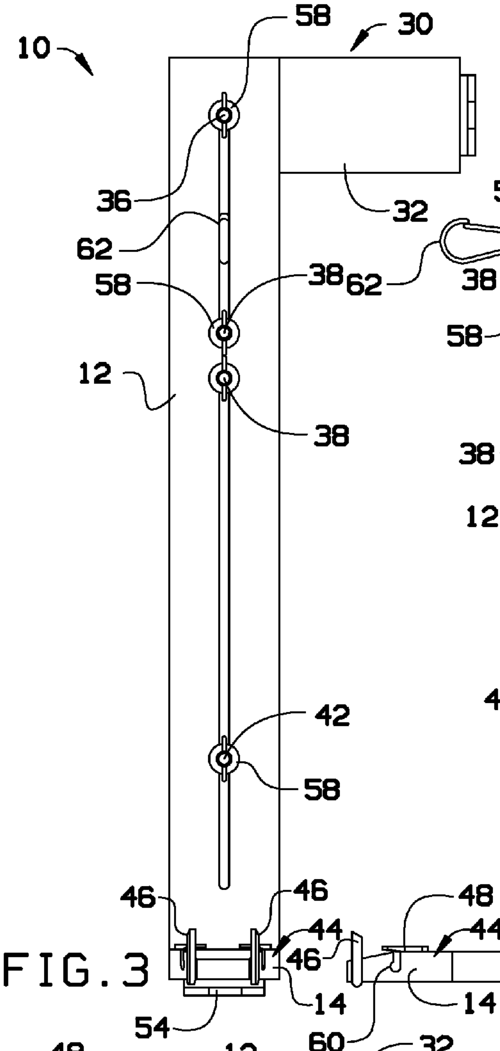
FIG. 3 illustrates a front view of the lantern support
Figure 4:
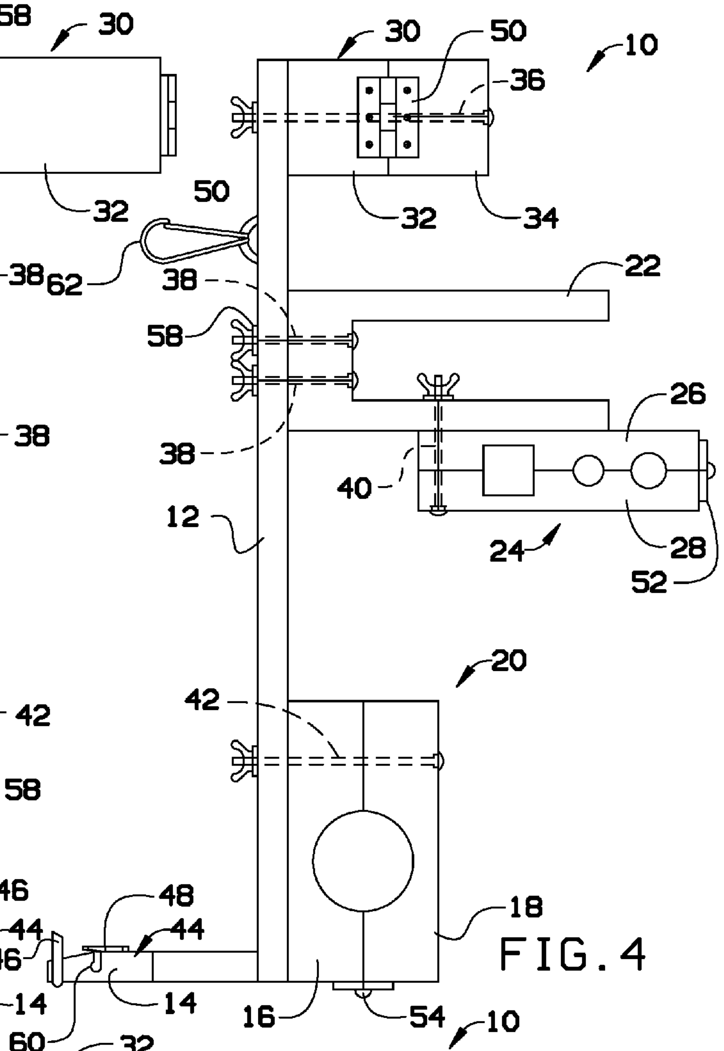
FIG. 4 illustrates a side view of the lantern support
Figure 5:
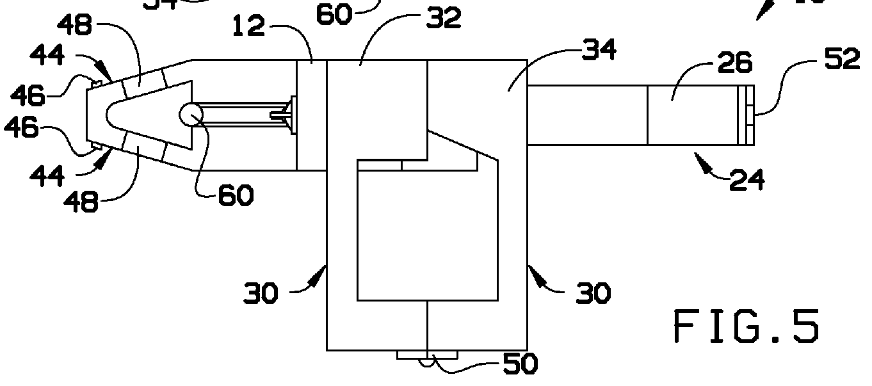
FIG. 5 illustrates a top view of the lantern support
Figure 6:
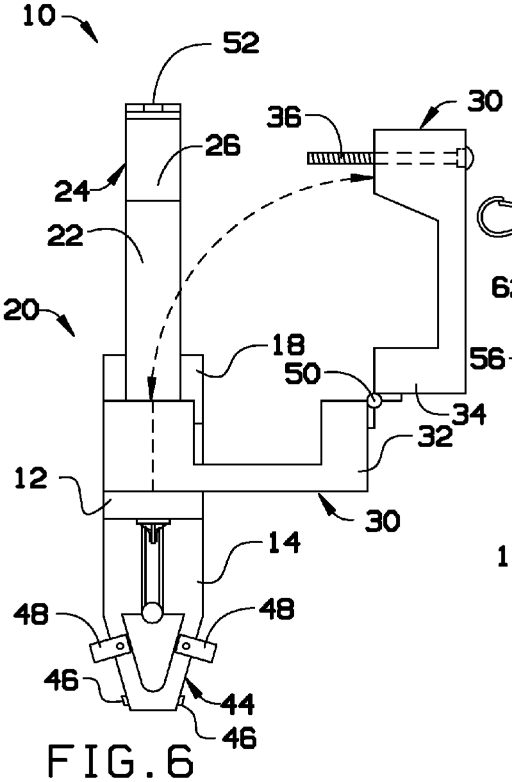
FIG. 6 illustrates a top view of the lantern support with post adapter 30 in an open position
Figure 7:
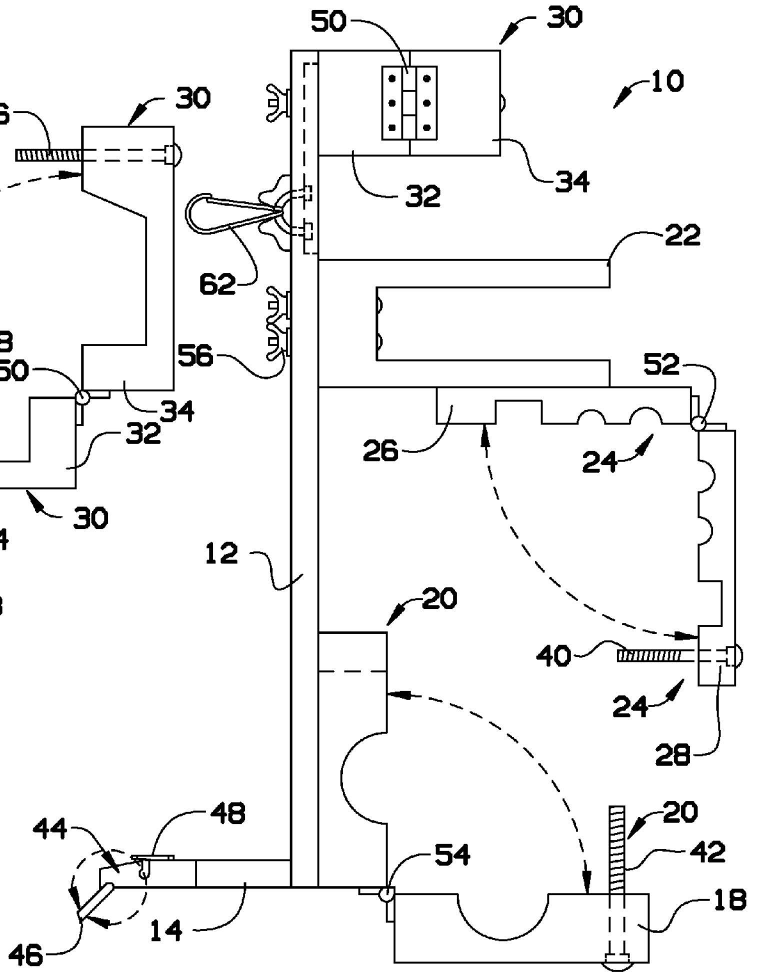
FIG. 7 illustrates side view of the lantern support with rail adapter 24 in an open position

A post adapter 30 measures about 7¼ inches long, 2¾ inches wide, and 5 inches high and is split down the center lengthwise and hinged on one end so that it can open to a full 180 degrees. On one half of post adapter 30, a rectangular indentation begins about 1¼ inch from the hinged side and measures 3½ inches long and approximately 1¾ inches deep. As best seen in FIG. 5, the other half of post adapter 30 consists of a unique indentation that begins 1¼ inch from the hinged side, going down at a right angle to a depth of approximately 1¾ inches deep continuing for about 3½ inches along the length of post adapter 30, then sloping upward for another ¾ inch, ending the indention. This sloping face allows for closing of the post adapter 30 around a square post without binding on the corners of the square post. An approximately 9/32 inches diameter hole extends up through the center of one half of post adapter 30 approximately ½ inches from the end opposite the hinge for receiving post adapter bolt 36. As in the rail adapter and the pole adapter, a bolt channel 1½ inches in length and ½ inches wide centered lengthwise is formed on the end opposite the hinge. Again, the bolt channel allows for opening and closing of the post adapter 30 without removal of the post adapter bolt 36.

Post adapter 30 may be connected to the back of the main body 12 of the lantern support along either the top or bottom channel with a 6 inch, ¼ diameter bolt 36, a washer 58, and a wing nut 56, just as the pole adapter 20 and swivels a full 360 degrees to be locked into any desired position.

Post adapter 30 is designed to attach the Lantern Holder to standard posts measuring approximately 3½ inches square. The channel on the end of the adapter opposite the hinge allows the 6 inch bolt coming up through the adapter to freely swing when the adapter is opened or closed like a clam shell. The uniquely slanted cutout on one half of the adapter allows it to open or close freely around a square post.

To operate lantern support 10, a user first chooses the object to attach the support to. Based upon this decision, the user then selects the appropriate one or more of the post 30, flat plane 22, rail 24 and pole 20 adapters and attaches the selected adapter or adapters to the lantern support 10. In the case of a gas lantern, the user then grasps a lantern by its handle, swivels top clips 48 of base clip 14 to their neutral position to expose channels 60 and sets the lantern base ridge directly into the keyhole channels 60 of the base clip 14. In the case of a propane lantern, the user first extends support braces 46 on either side of base dip 14 and then inserts the base ridge of the lantern into the keyhole channels 60. Next, the user swivels top clips 48 on base clip 14 to lock the lantern ridge in place. To secure the handle of the lantern, the user pushes in the spring clip on locking hook 62 with their free hand, slides the lantern handle into hook 62, then releases the spring clip. The Locking hook 62 could then be adjusted to the desired position along upper channel of main body 12. Finally, the lantern support with supported lantern may be attached to the chosen object with the chosen adapter.

Some described steps of use may be eliminated or rearranged. For example, a user may first attach the chosen adapter to the lantern support and the chosen object before attaching the lantern.

Elements of the lantern support of the present invention may be eliminated without deviation from present scope. For example, since each of the adapters is removable from the main body 12, any number of them may be used together or one may be used alone. Other adapters allowing attachment to different shaped objects may be provided.

While specific dimensions have been recited for each of the components of lantern support 10, it should be appreciated that other dimensions could be used without degrading the performance of the invention.

All parts are comprised of any hard, sturdy materials which include but are not limited to wood or plastic.

While most connections of the present invention have been described as being via bolts, screws, nuts and washers, any other appropriate known connectors may be used. For example, adhesives, hook-and-loop, etc.

The above-described embodiments of the invention are presented for purposes of illustration and not of limitation. Let it be understood that the steps of disclosed may be performed in a different order and remain within the scope of the present invention.

We claim:

1. A lantern support device comprising:

a generally elongate main body member having a length, a width and a thickness;

an upper channel formed in said main body member and extending along the length of said main body member from a first end of said main body member towards a center of said main body member;

a lower channel formed in said elongate main body member and extending along the length of said main body member from a second, opposite end of said main body member towards the center of said main body member;

wherein said upper channel has a first width on a front surface of said elongate base member and a second, greater width on a back surface of said base member;

a base clip extending in a direction generally perpendicular to said elongate main body member and having a generally trapezoidal cross-section;

a post adapter member attachable to said main body member by a bolt inserted into one of said upper or lower channels;

a rail adapter member attachable to said main body member by a bolt inserted into one of said upper or lower channels;

a pole adapter member attachable to said main body member by a bolt inserted into one of said upper or lower channels;

a flat plane adapter attachable to said main body member by a bolt inserted into one of said upper or lower channels and comprising a base portion having a length and two arm portions extending away from said base portion at a right angle to said length.

2. The lantern support device of claim 1, wherein said base clip member further comprises:

an opening formed a top surface of said base clip and extending through to a bottom surface of said base clip key-hole channel formed in a top surface of said base clip;

a keyhole channel formed in the top surface of said base clip extending in a direction parallel to said top surface;

first and second pivoting support braces pivotably mounted to opposing side surfaces of the base clip for rotation about an axis perpendicular to said side surfaces and capable of supporting a portion of a lantern;

first and second swiveling top dips rotatably mounted on said top surface of said base clip;

wherein a lantern may be supported by said base clip member and a portion of said lantern may be received in the keyhole channel.

3. The lantern support device of claim 2, wherein said post adapter member further comprises two halves;

a first of said two halves including a rectangular cutout;

a second of said two halves including a trapezoidal cutout;

a hinge connected on one side to said first half and on another side to said second half such that said first and second halves are capable of relative pivoting;

a hole extending through an end of said first half;

a slot extending through an end of said second half;

wherein the bolt may be received through said hole, said slot and said upper channel of said main body member simultaneously to secure the first and second halves in a closed position with said cutouts facing one another and said post adapter secured to the main body member.

4. The lantern support device of claim 3, wherein said rail adapter member further comprises two halves;

a first of said two halves including at least one rectangular cutout and at least one semi-circular cutout;

a second of said two halves including respective opposing cutouts;

a hinge connected on one side to said first half and on another side to said second half such that said first and second halves are capable of relative pivoting;

a hole extending through an end of said first half;

a slot extending through an end of said second half;

wherein the bolt may be received through said hole, said slot and said lower channel of said main body member simultaneously to secure the first and second halves in a closed position with said rectangular and semi-circular cutouts facing one another and said post adapter secured to the main body member.

5. The lantern support device of claim 4, wherein said pole adapter further comprises two halves;

a first of said two halves including at least one semi-circular cutout of a diameter larger than a diameter of said semi-circular cutouts of said first and second halves of said rail adapter member;

a second of said two halves including at least one opposing semi-circular cutout also having a diameter larger than a diameter of said semi-circular cutouts of said first and second halves of said rail adapter member;

a hinge connected on one side to said first half and on another side to said second half of said pole adapter member such that said first and second halves are capable of relative pivoting;

a hole extending through an end of said first half;

a slot extending through an end of said second half;

wherein the bolt may be received through said hole, said slot and said lower channel of said main body member simultaneously to secure the first and second halves in a closed position with said semi-circular cutouts facing one another and said post adapter secured to the main body member.

6. The lantern support device of claim 5, wherein said flat plane adapter further comprises:

wherein said arm portions of said flat plane adapter extend in the same direction;

wherein said arm portions include arm channels through exterior and interior surfaces extending in a direction along the length of said arm portions;

wherein said base portion also includes a channel member formed through exterior and interior surfaces and extending in a direction parallel to the length of said base portion;

wherein a bolt extending through the first and second halves of said rail adapter member may further extend into one of said channels of said arm portions and said base portion to removably attach said rail adapter to said flat plane adapter.

7. A lantern support device comprising:

a generally elongate main body member having a length, a width and a thickness;

an upper channel formed in said main body member and extending along the length of said main body member from a first end of said main body member towards a center of said main body member;

lower channel formed in said elongate main body member and extending along the length of said main body member from a second, opposite end of said main body member towards the center of said main body member;

wherein said upper channel has a first width on a front surface of said elongate base member and a second, greater width on a back surface of said base member;

a base clip extending in a direction generally perpendicular to said elongate main body member and having a generally trapezoidal cross-section;

an opening formed a top surface of said base clip and extending through to a bottom surface of said base clip key-hole channel formed in a top surface of said base clip;

a keyhole channel formed in the top surface of said base clip extending in a direction parallel to said top surface;

first and second pivoting support braces pivotably mounted to opposing side surfaces of the base clip for rotation about an axis perpendicular to said side surfaces and capable of supporting a portion of a lantern;

first and second swiveling top clips rotatably mounted on said top surface of said base clip;

wherein a lantern may be supported by said base clip member and a portion of said lantern may be received in the keyhole channel;

a rail adapter member attachable to said main body member by a bolt inserted into one of said upper or lower channels and comprising two halves;

a first of said two halves including at least one rectangular cutout and at least one semi-circular cutout;

a second of said two halve including respective opposing cutouts;

a hinge connected on one side to said first half and on another side to said second half such that said first and second halves are capable of relative pivoting;

a hole extending through an end of said first half;

a slot extending through an end of said second half;

wherein the bolt may be received through said hole, said slot and said lower channel of said main body member simultaneously to secure the first and second halves in a closed position with said rectangular and semi-circular cutouts facing one another and said post adapter secured to the main body member;

a flat plane adapter attachable to said main body member by a bolt inserted into one of said upper or lower channels and comprising a base portion having a length and two arm portions extending away from said base portion at a right angle to said length;

wherein said arm portions extend in the same direction;

wherein said arm portions include arm channels through exterior and interior surfaces extending in a direction along the length of said arm portions;

wherein said base portion also includes a channel member formed through exterior and interior surfaces and extending in a direction parallel to the length of said base portion;

wherein a holt extending through the first and second halves of said rail adapter member may further extend into one of said channels of said arm portions and said base portion to removably attach said rail adapter to said flat plane adapter.

8. The lantern support device of claim 7, further comprising:

a pole adapter member attachable to said main body member by a bolt inserted into one of said upper or lower channels and comprising two halves;

a first of said two halves including at least one semi-circular cutout of a diameter larger than a diameter of said semi-circular cutouts of said first and second halves of said rail adapter member;

a second of said two halves including at least one opposing semi-circular cutouts of cutout also having a diameter larger than a diameter of said semi-circular said first and second halves of said rail adapter member;

hinge connected on one side to said first half and on another side to said second half of said pole adapter member such that said first and second halves are capable of relative pivoting;

a hole extending through an end of said first half;

a slot extending through an end of said second half;

wherein the bolt may be received through said hole, said slot and said lower channel of said main body member simultaneously to secure the first and second halves in a closed position with said semi-circular cutouts facing one another and said post adapter secured to the main body member.

9. The lantern support device of claim 8, further comprising:

a post adapter member attachable to said main body member by a bolt inserted into one of said upper or lower channels and comprising two halves;

a first of said two halves including a rectangular cutout;

a second of said two halves including a trapezoidal cutout;

a hinge connected on one side to said first half and on another side to said second half such that said first and second halves are capable of relative pivoting;

a hole extending through an end of said first half;

a slot extending through an end of said second half;

wherein the bolt may be received through said hole, said slot and said upper channel of said main body member simultaneously to secure the first and second halves in a closed position with said cutouts facing one another and said post adapter secured to the main body member.

10. A lantern support device comprising:

a generally elongate main body member having a length, a width and a thickness;

an upper channel formed in said main body member and extending along the length of said main body member from a first end of said main body member towards a center of said main body member;

a lower channel formed in said elongate main body member and extending along the length of said main body member from a second, opposite end of said main body member towards the center of said main body member;

wherein said upper channel has a first width on a front surface of said elongate base member and a second, greater width on a back surface of said base member;

a base clip extending in a direction generally perpendicular to said elongate main body member and having a generally trapezoidal cross-section;

an opening formed a top surface of said base clip and extending through to a bottom surface of said base clip key-hole channel formed in a top surface of said base clip;

a keyhole channel formed in the top surface of said base clip extending in a direction parallel to said top surface;

first and second pivoting support braces pivotably mounted to opposing side surfaces of the base dip for rotation about an axis perpendicular to said side surfaces and capable of supporting a portion of a lantern;

first and second swiveling top clips rotatably mounted on said top surface of said base clip;

wherein a lantern may be supported by said base clip member and a portion of said lantern may be received in the keyhole channel;

a post adapter member attachable to said main body member by a bolt inserted into one of said upper or lower channels and comprising two halves;

a first of said two halves including a rectangular cutout;

a second of said two halves including a trapezoidal cutout;

a hinge connected on one side to said first half and on another side to said second half such that said first and second halves are capable of relative pivoting;

a hole extending through an end of said first half;

a slot extending through an end of said second half;

wherein the bolt may be received through said hole, said slot and said upper channel of said main body member simultaneously to secure the first and second halves in a closed position with said cutouts facing one another and said post adapter secured to the main body member;

a rail adapter member attachable to said main body member by a bolt inserted into one of said upper or lower channels and comprising two halves;

a first of said two halves including at least one rectangular cutout and at least one semi-circular cutout;

a second of said two halves including respective opposing cutouts;

a hinge connected on one side to said first half and on another side to said second half such that said first and second halves are capable of relative pivoting;

a hole extending through an end of said first half;

a slot extending through an end of said second half;

wherein the bolt may be received through said hole, said slot and said lower channel of said main body member simultaneously to secure the first and second halves in a closed position with said rectangular and semi-circular cutouts facing one another and said post adapter secured to the main body member;

a pole adapter member attachable to said main body member by a bolt inserted into one of said upper or lower channels and comprising two halves;

a first of said two halves including at least one semi-circular cutout of a diameter larger than a diameter of said semi-circular cutouts of said first and second halves of said rail adapter member;

a second of said two halves including at least one opposing semi-circular cutout also having a diameter larger than a diameter of said semi-circular cutouts of said first and second halves of said rail adapter member;

a hinge connected on one side to said first half and on another side to said second half of said pole adapter member such that said first and second halves are capable of relative pivoting;

a hole extending through an end of said first half;

a slot extending through an end of said second half;

wherein the bolt may be received through said hole, said slot and said lower channel of said main body member simultaneously to secure the first and second halves in a closed position with said semi-circular cutouts facing one another and said post adapter secured to the main body member;

a flat plane adapter attachable to said main body member by a bolt inserted into one of said upper or lower channels and comprising a base portion having a length and two arm portions extending away from said base portion at a right angle to said length;

wherein said arm portions extend in the same direction;

wherein said arm portions include arm channels through exterior and interior surfaces extending in a direction along the length of said arm portions;

wherein said base portion also includes a channel member formed through exterior and interior surfaces and extending in a direction parallel to the length of said base portion;

wherein a bolt extending through the first and second halves of said rail adapter member may further extend into one of said channels of said arm portions and said base portion to removably attach said rail adapter to said flat plane adapter.

* * * * *